(12) United States Patent
Park

(10) Patent No.: US 10,477,970 B2
(45) Date of Patent: Nov. 19, 2019

(54) GAS CYLINDER

(71) Applicant: SAMHONGSA CO., LTD., Seoul (KR)

(72) Inventor: Yong A. Park, Seoul (KR)

(73) Assignee: SAMHONGSA CO., LTD., Seoul (KR)

( * ) Notice: Subject to any disclaimer, the term of this patent is extended or adjusted under 35 U.S.C. 154(b) by 22 days.

(21) Appl. No.: 15/543,439

(22) PCT Filed: Jan. 14, 2016

(86) PCT No.: PCT/KR2016/000377
§ 371 (c)(1),
(2) Date: Jul. 13, 2017

(87) PCT Pub. No.: WO2016/114596
PCT Pub. Date: Jul. 21, 2016

(65) Prior Publication Data
US 2018/0008047 A1 Jan. 11, 2018

(30) Foreign Application Priority Data
Jan. 16, 2015 (KR) .......................... 10-2015-0008264

(51) Int. Cl.
*F16F 9/36* (2006.01)
*A47C 3/30* (2006.01)
(Continued)

(52) U.S. Cl.
CPC ................. *A47C 3/30* (2013.01); *A47C 3/24* (2013.01); *F16F 9/0245* (2013.01);
(Continued)

(58) Field of Classification Search
CPC .. A47C 3/30; A47C 3/24; F16F 9/0245; F16F 9/3235; F16F 9/362; F16F 9/366; F16F 9/58; F16F 9/025; F16F 9/3242
See application file for complete search history.

(56) References Cited

U.S. PATENT DOCUMENTS 9,239,089 B2 * 1/2016 Jun .................. F16F 9/0245
2004/0245831 A1 * 12/2004 Jeon ..................... A47C 3/30
297/344.19

FOREIGN PATENT DOCUMENTS

DE 20 2005 006935 U1 7/2005
EP 2 818 081 A1 12/2014
(Continued)

OTHER PUBLICATIONS

English translation International Search Report corresponding to PCT/KR2016/000377, dated Apr. 15, 2016.
(Continued)

*Primary Examiner* — Melanie Torres Williams
(74) *Attorney, Agent, or Firm* — Kilpatrick Townsend & Stockton LLP

(57) ABSTRACT

A gas cylinder includes: a base tube including a cavity; a spindle inserted into the cavity and performing a reciprocating motion in a longitudinal direction of the base tube; a cylinder mounted in the spindle and charged with gas; a piston dividing the cylinder into an upper chamber and a lower chamber; a valve portion sealing an upper portion of the cylinder and including a pipe holder having a cavity through which the gas is introduced; a flow prevention portion inserted into the spindle and having an inner surface contacting a surface of the spindle; and a spindle guide disposed between the base tube and the spindle and mounted to include at least a portion of the flow prevention portion.

11 Claims, 13 Drawing Sheets

(51) Int. Cl.
  *A47C 3/24*  (2006.01)
  *F16F 9/02*  (2006.01)
  *F16F 9/32*  (2006.01)
  *F16F 9/58*  (2006.01)

(52) U.S. Cl.
  CPC ............ *F16F 9/3235* (2013.01); *F16F 9/362* (2013.01); *F16F 9/58* (2013.01)

(56) References Cited

FOREIGN PATENT DOCUMENTS

| | | |
|---|---|---|
| JP | H10-169611 A | 6/1998 |
| KR | 1998-064493 U | 11/1998 |
| KR | 10-2004-0034385 A | 4/2004 |
| KR | 10-0786818 B1 | 12/2007 |
| KR | 10-0902182 B1 | 6/2009 |
| KR | 10-20110092114 A | 8/2011 |
| KR | 10-2012-0102234 A | 9/2012 |
| KR | 10-1233097 B1 | 2/2013 |
| KR | 10-2013-0078925 A | 7/2013 |
| KR | 10-2015-0000659 A | 1/2015 |

OTHER PUBLICATIONS

Written Opinion corresponding to PCT/KR2016/000377, dated Apr. 15, 2016, 8 pages.
European Search Report dated Jul. 30, 2018, from related EP Patent Application No. 16737560.9, all pages.

* cited by examiner

GAS CYLINDER

TECHNICAL FIELD

Embodiments of the present inventive concept relate to a gas cylinder.

BACKGROUND ART

In general, a gas cylinder implemented to a chair mainly includes a base tube and a gas spindle, and the height of a seat of the chair is adjusted by up and down movement of the spindle of the gas cylinder.

FIG. 13 is a schematic cross-sectional view showing a structure of a conventional gas cylinder 10.

Referring to FIG. 13, the conventional gas cylinder 10 includes a spindle 13 connected to a bottom surface of a seat of a chair, a base tube 11 supporting the spindle 13, and a tube guide 12 inserted between the base tube 11 and the spindle 13 and preventing left or right sloping of the spindle 13 when the spindle 13 rises or descends.

In detail, the conventional gas cylinder 10 includes a piston 23 performing a relative up and down reciprocating motion in the spindle 13, a piston rod 22 on which the piston 23 is mounted, and a cylinder 16 which is inserted into an inner circumferential surface of the spindle 13 and a surface of which contacts a surface of an O-ring mounted in an outer circumferential surface of the piston 23. Here, the cylinder 16 is divided into an upper chamber 20 and a lower chamber 21 by the piston 23.

Furthermore, the conventional gas cylinder 10 includes a gas sealant 24 sealing a bottom portion of the cylinder 16, a pipe holder 17 sealing an upper portion of the cylinder 16, an open and close pin 15 inserted into the pipe holder 17 by penetrating through a center of the pipe holder 17, and an open pin 14 adjusting the opening and closing of the open and close pin 15 via an up and down motion.

In detail, an orifice 18, through which gas is introduced, is formed on a side of the pipe holder 17, and the orifice 18 is opened and closed by the open and close pin 15. Also, a gas flow channel 19, through which gas discharged through the orifice 18 flows, is formed between the cylinder 16 and the spindle 13.

Hereinafter, an example of a process in which a user sits on a chair will be described to describe functions of the conventional gas cylinder 10 having this structure.

First, the open pin 14 is pressed when the user raises or lowers an operational lever (not shown) connected to the open pin 14 when the user sits on the chair. When the open pin 14 is pressed downwards, the open and close pin 15 descends. When the open and close pin 15 descends, gas stored in the upper chamber 20 flows to the orifice 18 along a side surface of the open and close pin 15. Nitrogen gas having flowed to the orifice 18 flows to the lower chamber 21 through the gas flow channel 19. Then, a volume of the lower chamber 21 becomes greater than a volume of the upper chamber 21 so that the spindle 13 descends. When the force that the user applies to the operational lever is eliminated, no more gas flows. Thus, the chair is fixed at a height desired by the user.

Information disclosed in this Background section was already known to the inventors of the present invention before achieving the present invention or is technical information acquired in the process of achieving the present invention. Therefore, it may contain information that does not form the prior art that is already known to the public in this country.

DETAILED DESCRIPTION OF THE INVENTION

Technical Problem

In order to make an up and down motion of the spindle 13 easy, fluids that are lubricous, such as oil or grease, are stored in an inner space of the base tube 11, or the fluids are spread on a surface of the spindle 13.

When the spindle 13 performs repetitive linear motions, the fluids that are stored may move along the surface of the spindle 13. However, when the spindle 13 performs upward linear motion, a portion of the spindle 13 is exposed to the outside, and thus, the fluids may be leaked to the outside along the surface of the spindle 13 and contaminate a surrounding environment of the conventional gas cylinder 10. Also, the fluids on the surface of the spindle 13 are revealed because an outer circumferential surface of the spindle 13 is shown from the outside of the conventional gas cylinder 10, and thus, the revealed fluids may deteriorate the beauty. Moreover, the user has to re-introduce the lost fluids to the inner space of the base tube 11.

Technical Solution

Embodiments of the present inventive concept aim to provide a gas cylinder configured to minimize the leakage of fluids to a surface of a spindle when the spindle performs a linear reciprocating motion.

According to an aspect of the present inventive concept, there is provided a gas cylinder including: a base tube including a cavity; a spindle inserted into the cavity and performing a reciprocating motion in a longitudinal direction of the base tube; a cylinder mounted in the spindle and charged with gas; a piston dividing the cylinder into an upper chamber and a lower chamber; a valve portion sealing an upper portion of the cylinder and including a pipe holder having a cavity through which the gas is introduced; a flow prevention portion inserted into the spindle and having an inner surface contacting a surface of the spindle; and a spindle guide disposed between the base tube and the spindle and mounted to include at least a portion of the flow prevention portion.

Advantageous Effect

According to embodiments of the present inventive concept, uniform adherence between a flow prevention portion and a spindle is formed to prevent a fluid on a surface of the spindle from being leaked to the outside of a gas cylinder. Also, a phenomenon in which the fluid leaked to the surface of the spindle forms a band or a phenomenon in which a discolored fluid spoils the beauty may be prevented.

BEST MODE

Figure 1:
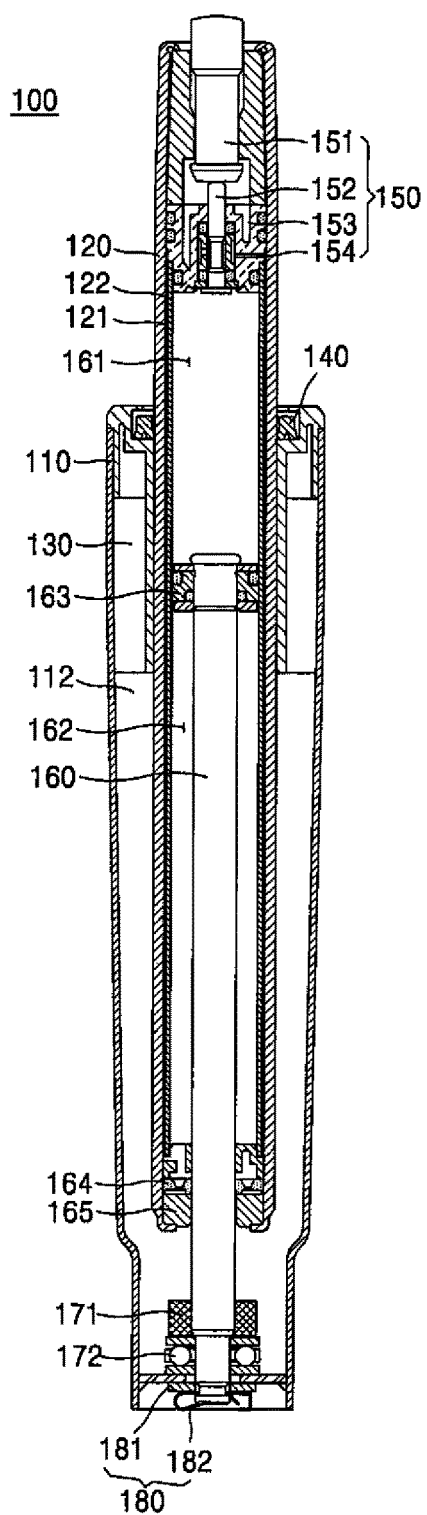
FIG. 1 is a cross-sectional view showing a structure of a gas cylinder according to an embodiment.

According to another aspect of the present inventive concept, there is provided a gas cylinder including: a base tube including a cavity; a spindle inserted into the cavity and performing a reciprocating motion in a longitudinal direction of the base tube; a cylinder mounted in the spindle and charged with gas; a piston dividing the cylinder into an upper chamber and a lower chamber; a valve portion sealing an upper portion of the cylinder and including a pipe holder having a cavity through which the gas is introduced; a flow prevention portion inserted into the spindle and having an inner surface contacting a surface of the spindle; and a spindle guide disposed between the base tube and the spindle and mounted to include at least a portion of the flow prevention portion.

The spindle guide may include a first mounting portion formed in a circumferential direction thereof, and the flow prevention portion may be disposed to be apart from a side wall of the first mounting portion.

The spindle guide may include a first stopper bump protruding from the side wall of the first mounting portion toward a center of the spindle in a longitudinal direction.

The first stopper bump may be formed to contact at least a portion of the flow prevention portion and limit movement of the flow prevention portion.

The flow prevention portion may include: a first bump protruding toward a center of the spindle; a second bump protruding toward the outside of the spindle; and a receiving groove formed between the first bump and the second bump.

An angle between an axis of the spindle and an axis of the first bump may be any one between 5 degrees to 40 degrees.

The flow prevention portion may include: a first bump protruding toward a center of the spindle; a second bump formed on the first bump and protruding toward the center of the spindle; and a receiving groove formed between the first bump and the second bump.

The gas cylinder may further include a first reinforcement portion disposed between the spindle and the spindle guide.

The spindle guide may include a first guide contacting the spindle and a second guide contacting the base tube, and the gas cylinder may further include a second reinforcement portion disposed between the first guide and the second guide.

According to another aspect of the present inventive concept, there is provided a gas cylinder including: a base tube including a cavity; a spindle inserted into the cavity and performing a reciprocating motion in a longitudinal direction of the base tube; a cylinder mounted in the spindle and charged with gas; a piston dividing the cylinder into an upper chamber and a lower chamber; a valve portion sealing an upper portion of the cylinder and including a pipe holder having a cavity through which the gas is introduced; a flow prevention portion inserted into the spindle and having an inner surface contacting a surface of the spindle; a spindle guide disposed between the base tube and the spindle and into which the flow prevention portion is inserted; and a cover inserted into the spindle guide and mounted to cover at least an area of an upper portion of the flow prevention portion.

The spindle guide may include, at an upper portion thereof, a second mounting portion having a step difference, and an outer surface of the flow prevention portion is apart from a side wall of the second mounting portion or an inner side wall of the cover.

The cover may include a second stopper bump protruding from the inner side wall of the cover toward a center of the spindle in a longitudinal direction.

The second stopper bump may be formed to contact at least a portion of the flow prevention portion and limit movement of the flow prevention portion.

The gas cylinder may further include a third reinforcement portion disposed between the spindle and the spindle guide.

The gas cylinder may further include a supporter mounted between the flow prevention portion and the cover.

According to another aspect of the present inventive concept, there is provided a gas cylinder including: a base tube including a cavity; a spindle inserted into the cavity and performing a reciprocating motion in a longitudinal direction of the base tube; a cylinder mounted in the spindle and charged with gas; a piston dividing the cylinder into an upper chamber and a lower chamber; a valve portion sealing an upper portion of the cylinder and including a pipe holder having a cavity through which the gas is introduced; a spindle guide mounted between the base tube and the spindle and guiding movement of the spindle; a flow prevention portion mounted above the spindle guide and inserted into the spindle so that an inner surface of the flow prevention portion contacts a surface of the spindle; and a protection cover mounted above the spindle guide to cover the flow prevention portion and limit movement of the flow prevention portion.

Mode of the Invention

The inventive concept now will be described more fully hereinafter with reference to the accompanying drawings, in which elements of the invention are shown. The advantages and features of the present inventive concept and methods of achieving the advantages and features will be described more fully with reference to the accompanying drawings, in which example embodiments of the inventive concept are shown. The inventive concept may, however, be embodied in many different forms and should not be construed as being limited to the embodiments set forth herein. It will be understood that, although the terms "first," "second," etc. may be used herein to describe various elements, these elements should not be limited by these terms. These terms are only used to distinguish one element from another. As used herein, the singular forms "a," "an," and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

Sizes of elements in the drawings may be exaggerated for convenience of explanation. In other words, since sizes and thicknesses of components in the drawings are arbitrarily illustrated for convenience of explanation, the following embodiments are not limited thereto. When a certain embodiment may be implemented differently, a specific process order may be performed differently from the described order. For example, two consecutively described processes may be performed substantially at the same time or performed in an order opposite to the described order.

Hereinafter, embodiments of the present inventive concept will be described in detail by referring to the accompanying drawings. Like reference numerals refer to like elements throughout, and repeated descriptions will not be given.

Figure 2:
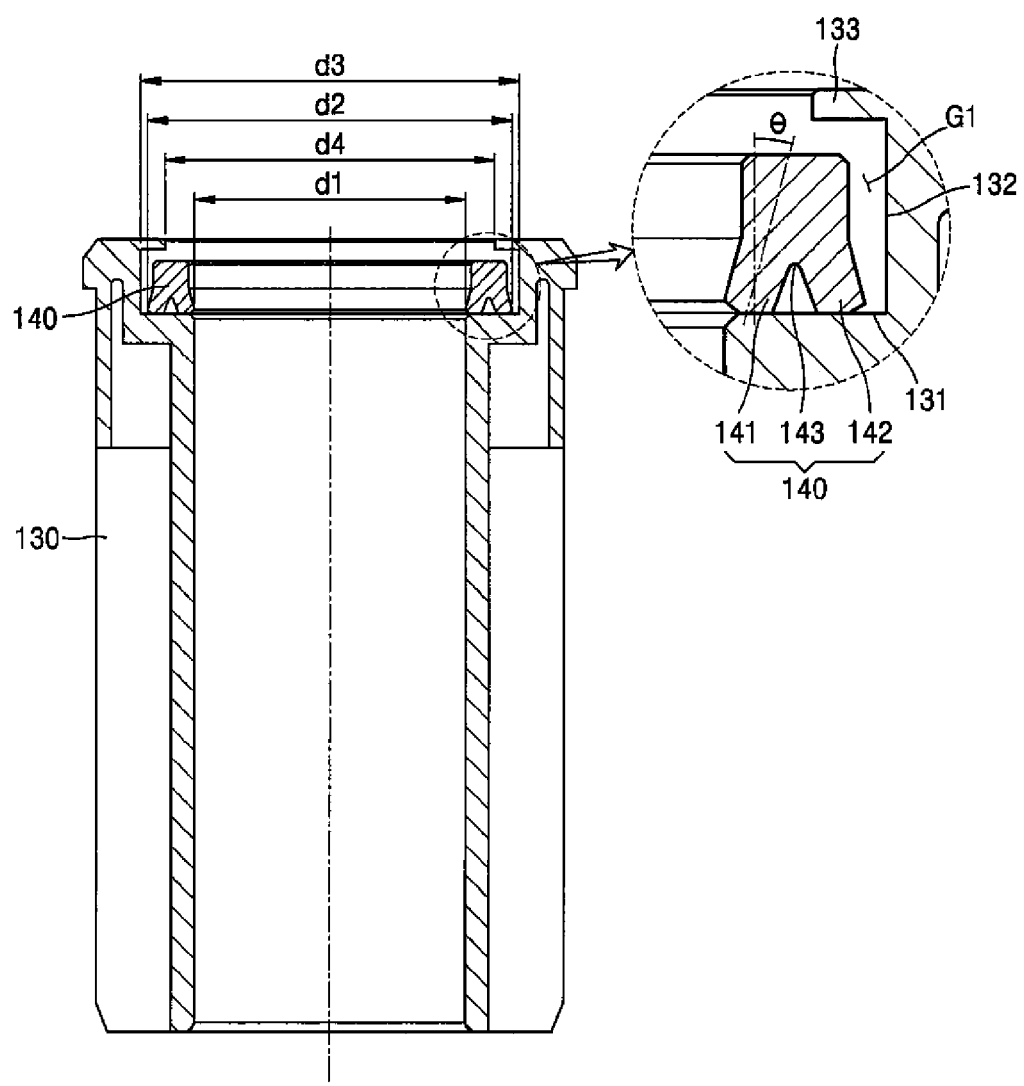
FIG. 2 is a cross-sectional view and an enlarged view showing a portion of the structure of FIG. 1.

FIG. 1 is a cross-sectional view showing a structure of a gas cylinder 100 according to an embodiment. FIG. 2 is a cross-sectional view and an enlarged view showing a portion of the structure of FIG. 1.

Referring to FIGS. 1 and 2, the gas cylinder 100 includes a base tube 110, a spindle 120, a spindle guide 130, a flow prevention portion 140, a valve portion 150, a piston rod 160, a buffer member 171, a bearing portion 172, and a fixing member 180.

The base tube 110 is included in a main body of the gas cylinder 100. The base tube 110 includes an inner space 112, in which the spindle 120, the spindle guide 130, the piston rod 160, the buffer member 171, and the bearing portion 172 may be formed. A fixing plate supporting the bearing portion 172 is provided on a surface of the base tube 110, and the fixing plate is coupled to the piston rod 160.

The spindle 120 may be inserted into a cavity of the base tube 110 and may perform a reciprocating motion in a longitudinal direction of the base tube 110. The spindle 120 may be coupled to the piston rod 160 and may perform a linear motion along the piston rod 160 and an inner circumferential surface of the base tube 110. Also, a cylinder 122 may be mounted in the spindle 120 so that the spindle 120 may perform an up and down motion due to a change in volumes of upper and lower chambers 161 and 162. The valve portion 150 may be mounted at an upper portion of the spindle 120 to control flow of gas between the upper and lower gas chambers 161 and 162, and a gas sealant 164 preventing leakage of gas toward a lower side of the cylinder 122 may be provided at a lower portion of the spindle 120. A flange 165 may be mounted below the gas sealant 164 to alleviate the shock that the spindle 120 receives from the buffer member 171 when the spindle 120 descends. Accordingly, the durability of the spindle 120 is increased.

The cylinder 122 may be divided into the upper chamber 161 and the lower chamber 162 by a piston 163 mounted at an upper end of the piston rod 160. A gas flow channel 121 through which gas flows between the upper chamber 161 and the lower chamber 162 is formed between an outer circumferential surface of the cylinder 122 and an inner circumferential surface of the spindle 120. The upper chamber 161 and the lower chamber 162 may be changed due to the gas flowing through the gas flow channel 121 so that the spindle 120 may perform a linear motion along an inner circumferential surface of the base tube 110 and the piston rod 160.

The spindle guide 130 may induce the up and down reciprocating motion of the spindle 120 to become a linear motion and may minimize the wobbling phenomenon in which the spindle 120 wobbles in left and right directions when performing the linear motion.

The spindle guide 130 is mounted at an upper portion of the base tube 110. The spindle guide 130 may be disposed between the base tube 110 and the spindle 120. For convenience of a manufacturing process, the spindle guide 130 may be integrally formed with the base tube 110 by extending from the base tube 110. Also, in order to make the mounting, repairing, and maintenance of the gas cylinder 100 easy, the spindle guide 130 may be formed separate from the base tube 110. However, hereinafter, for convenience of explanation, the case in which the spindle guide 130 is formed separate from the base tube 110 will be described.

The spindle guide 130 may include a first mounting portion 131 formed in an inner circumferential direction of the spindle guide 130. The first mounting portion 131 may include a side wall 132. The side wall 132 may be disposed to be apart from the flow prevention portion 140 by a predetermined distance. That is, the side wall 132 of the first mounting portion 131 does not contact an outer circumferential surface of the flow prevention portion 140, and the side wall 132 of the first mounting portion 131 and the outer circumferential surface of the flow prevention portion 140 may form a gap G1.

The spindle guide 130 may include a first stopper bump 133 protruding from the side wall 132 of the first mounting portion 131 toward a center of the spindle 120 in a longitudinal direction. The first stopper bump 133 may be formed to protrude from an upper end of the side wall 132 of the first mounting portion 131 toward the flow prevention portion 140.

The first stopper bump 133 may contact at least a portion of the flow prevention portion 140. The first stopper bump 133 may be formed to include an area of an upper portion of the flow prevention portion 140. The first stopper bump 133 may limit movement of the flow prevention portion 140, thereby preventing the flow prevention portion 140 from being lost at the spindle guide 130.

In detail, an internal diameter d4 of the first stopper bump 133 may be greater than a diameter d1 of the spindle 120 and may be less than an internal diameter of the side wall 132 of the first mounting portion 131. The flow prevention portion 140 may move upwards along with the spindle 120, when the spindle 120 performs an upward linear motion. The first stopper bump 133 may contact an upper surface of the flow prevention portion 140 to prevent the flow prevention portion 140 from being detached from the first mounting portion 131.

The flow prevention portion 140 may be inserted into the spindle 120 and mounted in the mounting portion 131. The flow prevention portion 140 may include a material having certain elasticity. The flow prevention portion 140 may prevent oil or grease on an outer surface of the spindle 120 from being discharged to the outside or revealed.

The flow prevention portion 140 may include a first bump 141 protruding from an inner circumferential surface of the flow prevention portion 140 toward a center of the spindle 120, a second bump 142 protruding from an outer circumferential surface of the flow prevention portion 140 toward the side wall 132 of the first mounting portion 131, and a receiving groove 143 formed between the first bump 141 and the second bump 142.

The first bump 141 may be in contact with an outer surface of the spindle 120. The flow prevention portion 140 may be inserted into the spindle 120 so that the inner circumferential surface of the flow prevention portion 140 contacts the outer surface of the spindle 120. The first bump 141 may increase adherence between the spindle 120 and the flow prevention portion 140.

The second bump 142 may make the flow prevention portion 140 maintain a certain gap from the side wall 132 of the first mounting portion 131. Although the flow prevention portion 140 is disposed to be apart from the side wall 132 of the first mounting portion 131, the flow prevention portion 140 may bump against the side wall 132 of the first mounting portion 131 due to an up and down motion of the spindle 120. The second bump 142 may be formed to protrude from the outer circumferential surface of the flow prevention portion 140 so that a contact surface between the outer circumferential surface of the flow prevention portion 140 and the side wall 132 of the first mounting portion 131 may be minimized. Also, the second bump 142 may prevent oil or grease flowing through the first bump 141 from being discharged to the first mounting portion 131 or to the outside.

The receiving groove 143 may be formed between the first bump 141 and the second bump 142 in a circumferential direction of the flow prevention portion 140. The receiving groove 143 may store the oil or grease having penetrated through the first bump 141. The flow of the oil or grease having penetrated through the first bump 141 may be stopped by the second bump 142. The receiving groove 143 may store the oil or grease so that the oil or grease is not discharged to the outside.

The first bump 141 may be formed to protrude from the inner circumferential surface of the flow prevention portion 140 toward the spindle 120. The first bump 141 may be formed to protrude from the inner circumferential surface of the flow prevention portion 140 at an angle of θ. θ may be any one between about 5 degrees and about 70 degrees so that the oil on the surface of the spindle 120 may be prevented from being leaked to the outside of the spindle guide 130.

In particular, θ may be any one between about 5 degrees and about 40 degrees. When θ is less than about 5 degrees, adherence between the spindle 120 and the flow prevention portion 140 is reduced, and thus, it is difficult to effectively prevent the leakage of the oil. When θ is greater than about 40 degrees, adherence between the spindle 120 and the flow prevention portion 140 is increased, and thus, a strong frictional force may be applied to the spindle 120 when the spindle 120 performs a linear motion. Similarly to the first bump 141, the second bump 142 may be formed to protrude from the outer circumferential surface of the flow prevention portion 140 toward the side wall 132. An external diameter d2 of the flow prevention portion 140 may be less than a distance d3 between the side walls 132 of the first mounting portion 131 so that a gap G1 may be formed between the side wall 132 and the flow prevention portion 140. The flow prevention portion 140 may be disposed to be apart from the side wall 132 of the first mounting portion 131. The inner circumferential surface of the flow prevention portion 140 adheres to the surface of the spindle 120, while the outer circumferential surface of the flow prevention portion 140 is not coupled to or contacts the surface of the spindle 120.

The valve portion 150 is formed at an upper portion of the cylinder 122 to seal the upper portion of the cylinder 122 and control the flow of gas. The valve portion 150 may include an open pin 151, an open and close pin 152, a pipe holder 153, and an orifice 154.

In detail, the pipe holder 153 may seal the upper portion of the cylinder 122 and form a cavity. The open and close pin 152 may be mounted in the pipe holder 153 by penetrating through the cavity of the pipe holder 153 and allow gas in the cylinder 120 to flow. The open pin 151 may be mounted above the open and close pin 152 and press the open and close pin 152. The orifice 154 may be formed in the pipe holder 153 and may allow gas charged in the cylinder 122 to flow through the cylinder 122 and the gas flow channel 121.

The piston rod 160 may be inserted into the base tube 110 and supported by the base tube 110 via the fixing member 180. In detail, a fixing clip 182 may be coupled to a bottom portion of the piston rod 160 so that the piston rod 160 is not allowed to be detached from the base tube 110. A clip washer 181 may be inserted between the base tube 110 and the fixing clip 182, and the clip washer 181 may prevent a fixing plate of the base tube 110 from directly contacting the fixing clip 182 and being damaged.

The buffer member 171 may be mounted between the spindle 120 and the bearing portion 172 in order to absorb shock when the spindle 120 performs a linear motion. That is, the buffer member 171 may alleviate the shock generated when the spindle 120 performs a descending motion and the bottom of the spindle 120 collides with the bearing portion 172. Also, the buffer member 171 may reduce the noise generated when the spindle 120 hits the bearing portion 172 and improve the durability of the bearing portion 172. The bearing portion 172 may be mounted below the piston rod 160 to support the piston rod 160 and allow the piston rod 160 to rotate.

In order to make the up and down motion of the spindle 120 easy, fluids that are lubricous, such as oil or grease, are stored in the inner space 112 of the base tube 110 or are spread on the surface of the spindle 120. When the spindle 120 performs repetitive linear motions, the fluids that are stored may move along the surface of the spindle 120. However, when the spindle 120 performs an upward linear motion, a portion of the spindle 120 is exposed to the outside, and thus, the fluids may be leaked to the outside along the surface of the spindle 120 and contaminate a surrounding environment of the gas cylinder 100. Also, since the fluids on the surface of the spindle 120 are revealed because an outer circumferential surface of the spindle 120 is shown from the outside of the gas cylinder 100, the revealed fluids may spoil the beauty. Also, the user has to re-introduce the lost fluids to the inner space 112 of the base tube 110.

The method in which the flow prevention portion 140 prevents the fluids on the inner circumferential surface of the spindle 120 from being shown at the upper portion of the flow prevention portion 140 or from being leaked to the outside will be described below.

The flow prevention portion 140 is inserted into the spindle 120. The inner circumferential surface of the flow prevention portion 140 adheres to an outer surface of the spindle 120. In particular, since the first bump 141 protrudes from the inner circumferential surface of the flow prevention portion 140, the first bump 141 may increase adherence between the flow prevention portion 140 and the spindle 120.

The outer circumferential surface of the flow prevention portion 140 is apart from the side wall 132 of the first mounting portion 131, and thus, the flow prevention portion 140 may not have interference or external pressure from the spindle guide 130.

In order to prevent the leakage of the fluids, it is important that the flow prevention portion 140 form uniform adherence toward the center of the spindle 120. If the adherence between the flow prevention portion 140 and the spindle 120 is not uniform, the fluid may gather to a portion where the adherence is relatively less to be leaked easily.

The flow prevention portion 140 is formed to be apart from the side wall 132 of the first mounting portion 131, and thus, uniform adherence is formed between the flow prevention portion 140 and the spindle 120. That is, since the outer circumferential surface of the flow prevention portion 140 does not receive external pressure from the spindle guide 130, the adherence between the flow prevention portion 140 and the spindle 120 is not changed, even if the spindle 120 performs a linear motion. Thus, the amount of fluids flowing through the flow prevention portion 140 may be minimized, and thus, even if the spindle 120 performs the linear motion, the fluid may not be shown at or leaked to the upper portion of the flow prevention portion 140.

Figure 12:
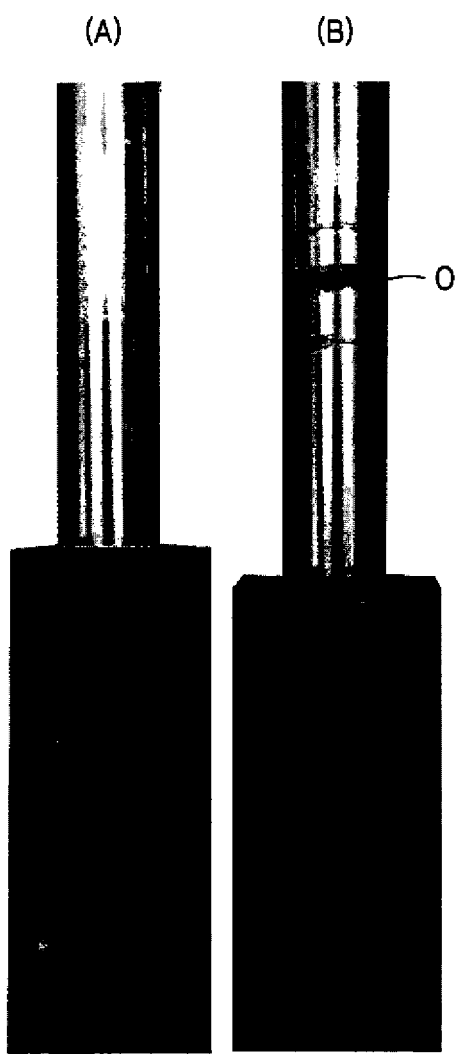
FIG. 12 shows pictures showing a front surface of a conventional gas cylinder, and a front surface of a gas cylinder according to an embodiment.
Figure 13:
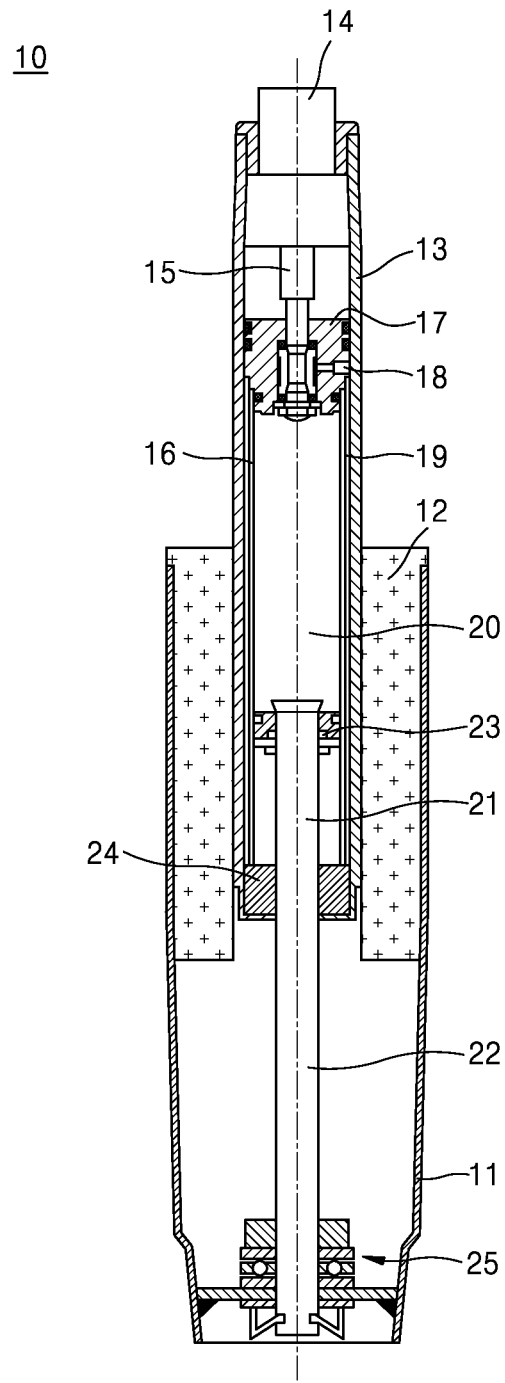
FIG. 13 is a schematic cross-sectional view showing a structure of a conventional gas cylinder.

FIG. 12 shows pictures of a front surface of a gas cylinder according to an embodiment and a front surface of a conventional gas cylinder Gas cylinder A shows an outer circumferential surface of a spindle after the gas cylinder according to the present embodiment performs a linear reciprocating motion by one hundred (100) times or more, and gas cylinder B shows an outer circumferential surface of a spindle after the conventional gas cylinder performs a linear reciprocating motion by one hundred (100) times or more.

As shown in gas cylinder B, when the spindle performs the linear reciprocating motion, oil or grease in a base tube or on an outer surface of the spindle moves up along the spindle and is observed from the outside as an oil band.

As shown in gas cylinder A, when the gas cylinder includes a spindle guide and a flow prevention portion, uniform adherence is formed between the flow prevention portion and the spindle so that an oil band is not observed from the outside even if the spindle performs an up and down motion.

Figure 3:
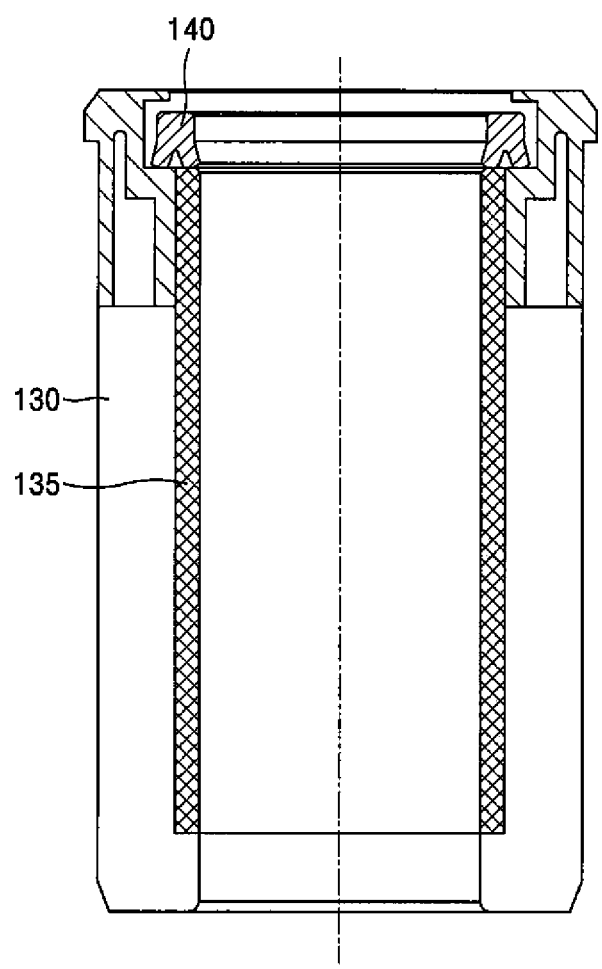
FIGS. 3, 4, and 5 are cross-sectional views showing a spindle guide and a flow prevention portion according to modified embodiments.
Figure 4:
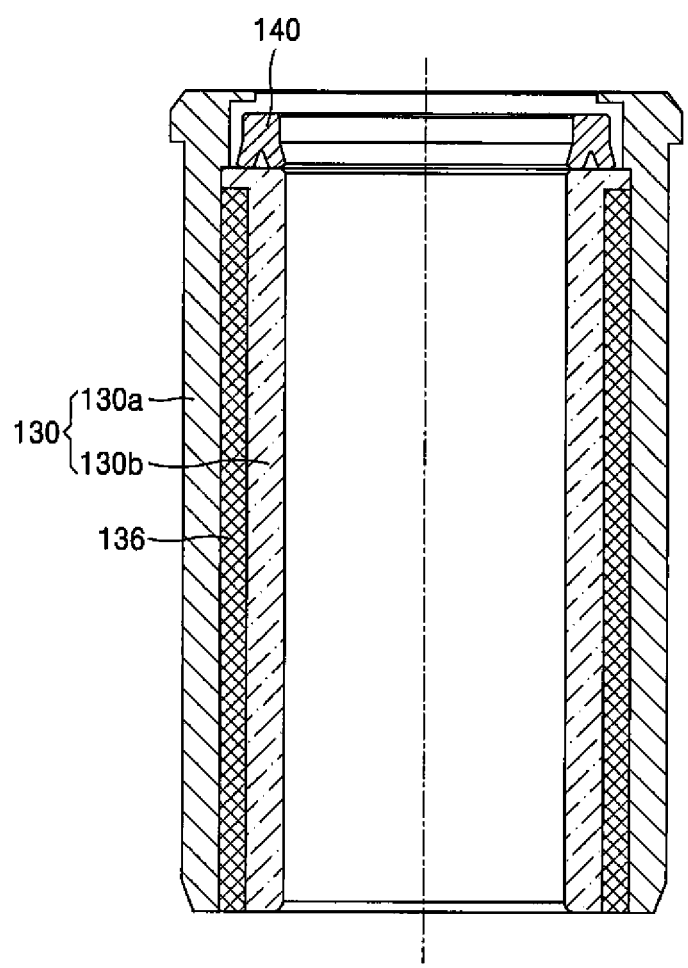
Figure 5:
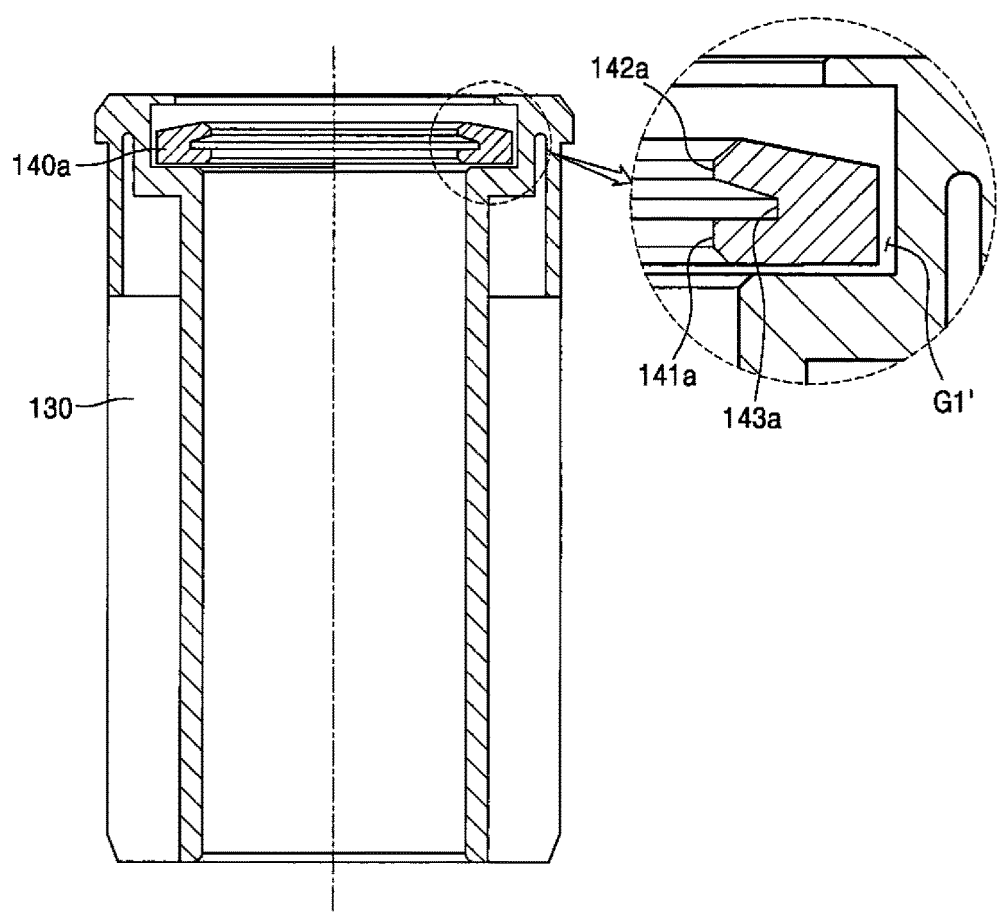

FIGS. 3, 4, and 5 are cross-sectional views showing a spindle guide 130 and a flow prevention portion according to modified embodiments.

Referring to FIG. 3, the gas cylinder 100 may further include a first reinforcement portion 135 disposed between the spindle 120 and the spindle guide 130.

The first reinforcement portion 135 may include a material having rigidity, wherein the material is not limited to particular ones. For example, metal materials, such as copper or iron, or non-metal materials, such as carbon silicon, may be used. The first reinforcement portion 135 may improve the rigidity of the spindle guide 130. When a user sits on a chair and forms a bending moment on the spindle 120, the first reinforcement portion 135 may minimize a wobble phenomenon and improve the durability of the gas cylinder 100.

Referring to FIG. 4, the spindle guide 130 may be separated into a first guide 130a and a second guide 130b, and a second reinforcement portion 136 may be mounted in the spindle guide 130.

The spindle guide 130 may include the first guide 130a contacting the spindle 120 and the second guide 130b contacting the base tube 110. The first guide 130a may be separated from the second guide 130b. Since the spindle guide 130 may be separated into the first guide 130a and the second guide 130b, when a portion of the spindle guide 130 is fractured or a function of the portion deteriorates, the portion may be replaced. Also, since the spindle guide 130 is separable, the maintenance of the gas cylinder 100 may become easy.

The second reinforcement portion 136 may be mounted between the first guide 130a and the second guide 130b. The second reinforcement portion 136 may improve the rigidity of the spindle guide 130 like the first reinforcement portion 135 described above.

Referring to FIG. 5, a flow prevention portion 140a may include a plurality of bumps protruding toward the center of the spindle 120.

The flow prevention portion 140a may include a first bump 141a protruding toward the center of the spindle 120, a second bump 142a mounted on the first bump 141a, and a receiving groove 143a formed between the first bump 141a and the second bump 142a.

The first bump 141a may be disposed toward the spindle 120 and prevent the oil on the surface of the spindle 120 from being leaked. The second bump 142a may prevent a portion of oil leaked from the first bump 141a from being discharged to the outside, and the receiving grove 143a may store the oil received from the second bump 142a.

Figure 6:
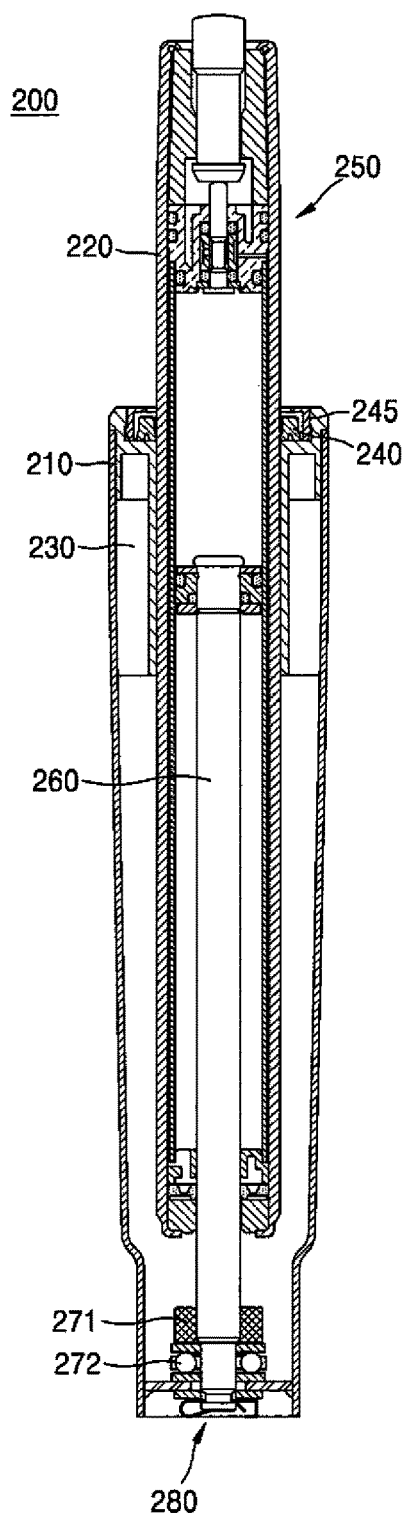
FIG. 6 is a cross-sectional view showing a structure of a gas cylinder according to another embodiment.
Figure 7:
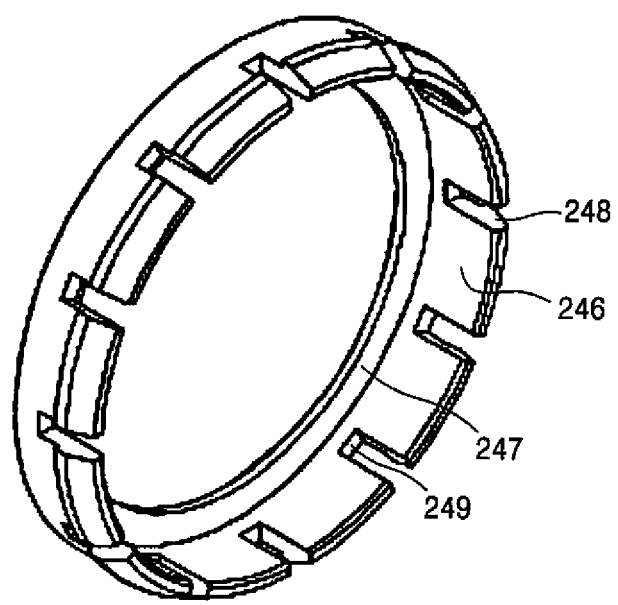
FIG. 7 is a perspective view of a cover illustrated in FIG. 6.
Figure 8:
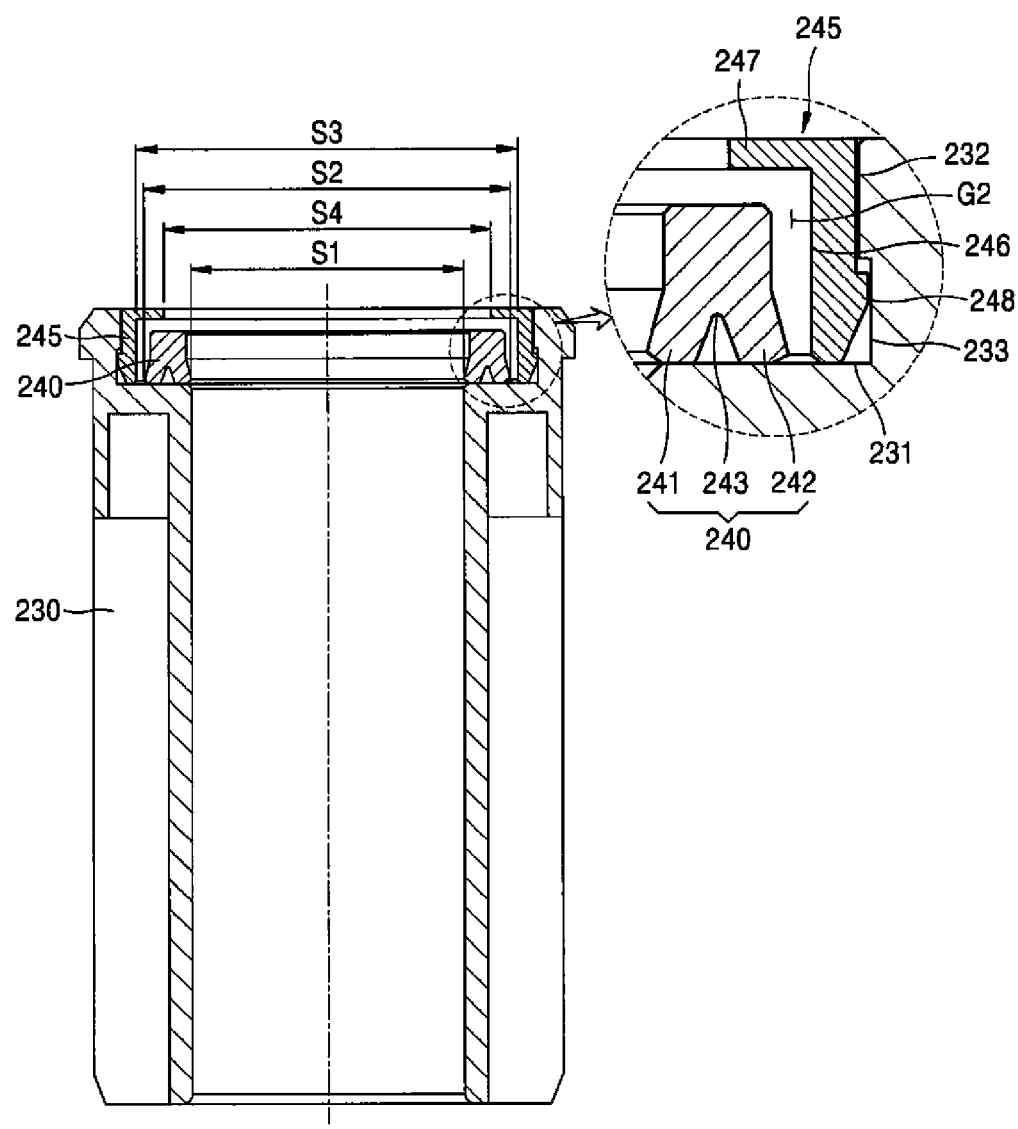
FIG. 8 is a cross-sectional view and an enlarged view showing a portion of a structure of FIG. 5.

FIG. 6 is a cross-sectional view showing a structure of a gas cylinder 200 according to another embodiment, and FIG. 7 is a perspective view of a cover 245 illustrated in FIG. 6. FIG. 8 is a cross-sectional view and an enlarged view showing a portion of the structure of FIG. 6.

Referring to FIGS. 6 through 8, the gas cylinder 200 may include a base tube 210, a spindle 220, a spindle guide 230, a flow prevention portion 240, the cover 245, a valve portion 250, a piston rod 260, a buffer member 271, a bearing portion 272, and a fixing member 280. However, the present embodiment is identical to the embodiment described above and differs from the embodiment only in terms of shapes and structures of the spindle guide 230, the flow prevention portion 240, and the cover 245. Thus, identical structures will not be described in detail, and the description of the above embodiment applies hereto.

The spindle guide 230 may be disposed between the base tube 210 and the spindle 220. The spindle guide 230 may include, at an upper portion thereof, a second mounting portion 231 having a step difference. The second mounting portion 231 may form a space in which the flow prevention portion 240 and the cover 245 are mounted.

The cover 245 may be tightly coupled to a side wall 232 of the spindle guide 230. A tight fit bump 248 may be formed at an end of the cover 245, and a tight fit groove 233 may be formed at the side wall 232 of the spindle guide 230. The tight fit bump 248 may be inserted into the tight fit groove 233 so that the cover 245 may be fixed to the spindle guide 230. A groove 249 may be formed at another tight fit bump adjacent to the tight fit bump 248 so that the tight fit bump 248 may be easily coupled to the tight fit groove 233.

The cover 245 may include a second stopper bump 247 protruding from the side wall thereof toward the center of the spindle 220 in a longitudinal direction. A diameter S4 of the second stopper bump 247 may be greater than an internal diameter S1 of the flow prevention portion 240 and may be less than an external diameter S2 of the flow prevention portion 240. The flow prevention portion 240 may be in contact with the second stopper bump 247, and thus, movement of the flow prevention portion 240 may be limited. That is, the second stopper bump 247 may prevent the flow prevention portion 240 from being detached from the second mounting portion 231.

The flow prevention portion 240 may be mounted in the cover 245 and may include a first bump 241, a second bump 242, and a receiving groove 243. The shapes and functions of the first bump 241, the second bump 242, and the receiving groove 243 are the same or substantially the same as those of the first bump 141, the second bump 142, and the receiving groove 143 of the flow prevention portion 140 according to the embodiment described above, and thus, they will be briefly described or will not be described.

An outer circumferential surface of the flow prevention portion 240 is apart from the side wall of the cover 245. A distance S3 between the side walls of the cover 245 may be greater than an external diameter S2 of the flow prevention portion 240. That is, a predetermined gap G2 may be formed between the outer circumferential surface of the flow prevention portion 240 and the side wall of the cover 245. Thus, the outer circumferential surface of the flow prevention portion 240 does not have interference or external pressure from the cover 245.

Since the flow prevention portion 240 does not have interference or external pressure from the cover 245, uniform adherence may be formed between the flow prevention portion 240 and the spindle 220. Thus, the amount of fluids flowing through the flow prevention portion 240 may be minimized, and thus, even if the spindle 220 performs a linear motion, the fluids may not be revealed at or leaked to an upper portion of the flow prevention portion 240.

Figure 9:
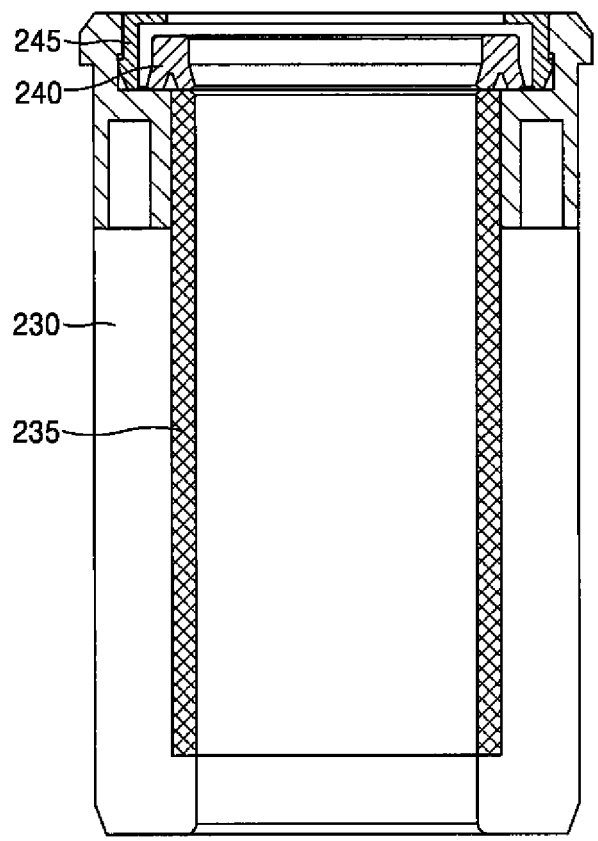
FIGS. 9 and 10 are cross-sectional views showing a spindle guide and a flow prevention portion according to other modified embodiments.
Figure 10:
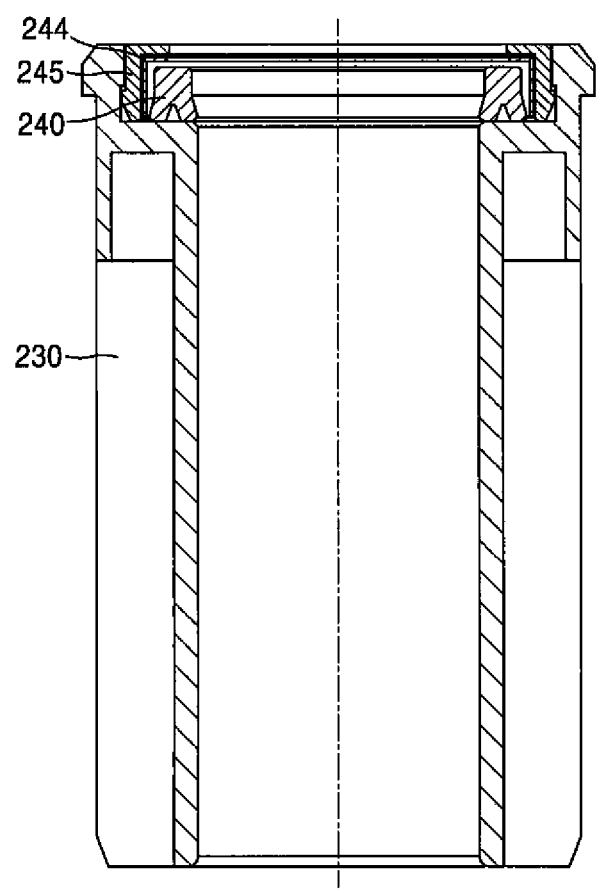

FIGS. 9 and 10 are cross-sectional views showing the spindle guide 230 and the flow prevention portion 240 according to other modified embodiments.

Referring to FIG. 9, the gas cylinder 200 may further include a third reinforcement portion 235 disposed between the spindle 220 and the spindle guide 230.

The third reinforcement portion 235 may include a material having rigidity, wherein the material is not limited to particular ones. For example, metal materials, such as copper or iron, or non-metal materials, such as carbon silicon, may be used. The third reinforcement portion 235 may improve the rigidity of the spindle guide 230 and improve the durability of the gas cylinder 200.

Referring to FIG. 10, the gas cylinder 200 may further include a supporter 244 mounted between the flow prevention portion 240 and the cover 245.

The supporter 244 may be mounted to contact an inner surface of the cover 245, and may improve the rigidity of the cover 245. For example, the supporter 244 may include a metal material, such as iron, or a non-metal material, such as carbon silicon, to improve the rigidity of the cover 245.

Figure 11:
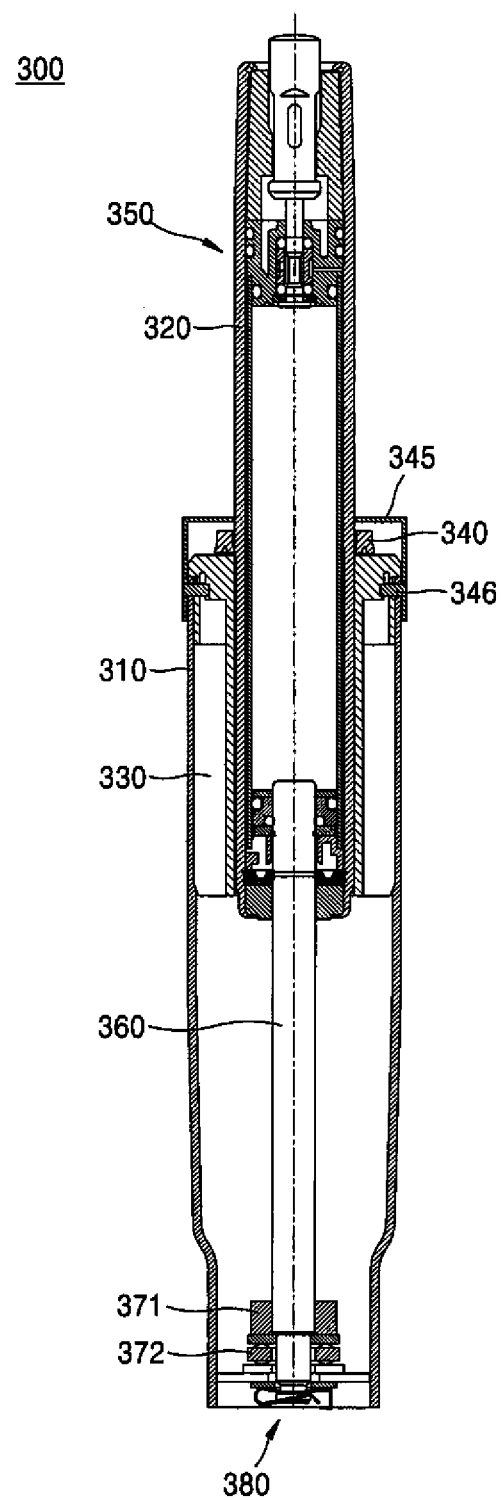
FIG. 11 is a cross-sectional view showing a structure of a gas cylinder according to another embodiment.

FIG. 11 is a cross-sectional view showing a structure of a gas cylinder 300 according to another embodiment.

Referring to FIG. 11, the gas cylinder 300 may include a base tube 310, a spindle 320, a spindle guide 330, a flow prevention portion 340, a protection cover 345, a valve portion 350, a piston rod 360, a buffer member 371, a bearing portion 372, and a fixing member 380. However, the present embodiment is identical to the embodiment described above and differs from the embodiment only in terms of the arrangement of the flow prevention portion 340 and the cover 345. Thus, identical structures will not be described in detail, and the description of the above embodiment applies hereto.

The flow prevention portion 340 may be mounted above the spindle guide 330. The flow prevention portion 340 may be inserted into the spindle 320 so that an inner surface of the flow prevention portion 340 may contact a surface of the spindle 320. Since the flow prevention portion 340 may be mounted above the spindle guide 330, replacement and cleansing thereof may become easy.

The protection cover 345 may be mounted above the spindle guide 330 to cover the flow prevention portion 340. The protection cover 345 may limit upward movement of the flow prevention portion 340, which may be performed along with the spindle 230 when the spindle 230 performs upward movement. The protection cover 345 may be fixed to the base tube 310 or the spindle guide 330 via a fixing pin 346.

While the present inventive concept has been particularly shown and described with reference to exemplary embodiments thereof, it will be understood by one of ordinary skill in the art that various changes in form and details may be made therein without departing from the spirit and scope of the present inventive concept as defined by the following claims. Hence, it will be understood that the embodiments described above are not limiting of the scope of the invention. For example, each component described in a single type may be executed in a distributed manner, and components described distributed may also be executed in an integrated form.

The scope of the present inventive concept is indicated by the claims rather than by the detailed description of the invention, and it should be understood that the claims and all modifications or modified forms drawn from the concept of the claims are included in the scope of the present inventive concept.

INDUSTRIAL APPLICABILITY

According to an embodiment of the present inventive concept, there is provided a gas cylinder configured to prevent the leakage of a fluid on a surface of a spindle to the outside. For industrial applicability, embodiments of the present inventive concept may be applied to a device or an apparatus including the gas cylinder.

The invention claimed is:

1. A gas cylinder comprising:
   a base tube comprising a cavity;
   a spindle inserted into the cavity and performing a reciprocating motion in a longitudinal direction of the base tube;
   a cylinder mounted in the spindle and charged with gas;
   a piston dividing the cylinder into an upper chamber and a lower chamber;
   a valve portion sealing an upper portion of the cylinder and comprising a pipe holder having a cavity through which the gas is introduced;
   a flow prevention portion inserted into the spindle and having an inner surface contacting a surface of the spindle; and
   a spindle guide disposed between the base tube and the spindle and mounted to comprise at least a portion of the flow prevention portion;
   wherein:
      the spindle guide comprises a first mounting portion formed along an inner surface of the spindle guide in a circumferential direction, and a first stopper bump protruding from an inner side wall toward the spindle;
      an inner circumferential surface of the flow prevention portion contacts the surface of the spindle, while an outer circumferential surface of the flow prevention portion is spaced apart from the inner side wall of the spindle guide; and
      the flow prevention portion moves between a bottom surface of the first mounting portion and the first stopper bump when the spindle reciprocates in a longitudinal direction of the base tube.

2. The gas cylinder of claim 1, wherein the first stopper bump is formed to contact at least a portion of the flow prevention portion and limit movement of the flow prevention portion.

3. The gas cylinder of claim 1,
wherein the flow prevention portion comprises:
a first bump protruding toward a center of the spindle;
a second bump formed on the first bump and protruding toward the center of the spindle; and
a receiving groove formed between the first bump and the second bump.

4. The gas cylinder of claim 1, further comprising a first reinforcement portion disposed between the spindle and the spindle guide.

5. The gas cylinder of claim 1, wherein the spindle guide comprises a first guide contacting the spindle and a second guide contacting the base tube, further comprising a second reinforcement portion disposed between the first guide and the second guide.

6. The gas cylinder of claim 1, wherein the flow prevention portion comprises:
a first bump protruding toward a center of the spindle;
a second bump protruding toward the outside of the spindle; and
a receiving groove formed between the first bump and the second bump.

7. The gas cylinder of claim 6, wherein an angle between an axis of the spindle and an axis of the first bump is any one between 5 degrees to 40 degrees.

8. A gas cylinder comprising:
a base tube comprising a cavity;
a spindle inserted into the cavity and performing a reciprocating motion in a longitudinal direction of the base tube;
a cylinder mounted in the spindle and charged with gas;
a piston dividing the cylinder into an upper chamber and a lower chamber;
a valve portion sealing an upper portion of the cylinder and comprising a pipe holder having a cavity through which the gas is introduced;
a flow prevention portion inserted into the spindle and having an inner surface contacting a surface of the spindle;
a spindle guide disposed between the base tube and the spindle and into which the flow prevention portion is inserted; and
a cover inserted into the spindle guide and mounted to cover at least an area of an upper portion of the flow prevention portion;
wherein:
the cover comprises a side wall inserted into a second mounting portion, and a second stopper bump protruding from the side wall toward the spindle;
the second mounting portion is formed along an inner surface of the spindle guide in a circumferential direction;
an inner circumferential surface of the flow prevention portion contacts the surface of the spindle, while an outer circumferential surface of the flow prevention portion is spaced apart from the side wall of the cover; and
the flow prevention portion moves between a bottom surface of the second mounting portion and the second stopper bump when the spindle reciprocates in a longitudinal direction of the base.

9. The gas cylinder of claim 8, wherein the second stopper bump is formed to contact at least a portion of the flow prevention portion and limit movement of the flow prevention portion.

10. The gas cylinder of claim 8, further comprising a reinforcement portion disposed between the spindle and the spindle guide.

11. The gas cylinder of claim 8, further comprising a supporter mounted between the flow prevention portion and the cover.

* * * * *